United States Patent [19]

St. Clair et al.

[11] Patent Number: 5,849,806
[45] Date of Patent: Dec. 15, 1998

[54] RESILIENT POLYURETHANE FOAMS OF POLYDIENE DIOLS AND TACKIFYING RESIN

[75] Inventors: David John St. Clair; Hector Hernandez, both of Houston, Tex.

[73] Assignee: Shell Oil Company, Houston, Tex.

[21] Appl. No.: 80,997

[22] Filed: May 19, 1998

Related U.S. Application Data

[60] Provisional application No. 60/047,522, May 23, 1997.

[51] Int. Cl.$^6$ .............................. C08G 18/32; C08G 18/04
[52] U.S. Cl. ........................ 521/109.1; 521/132; 521/137; 521/139; 521/155; 521/170; 521/174
[58] Field of Search ................................. 521/109.1, 132, 521/137, 139, 155, 170, 174

[56] References Cited

U.S. PATENT DOCUMENTS

| | | | |
|---|---|---|---|
| 4,939,184 | 7/1990 | Kennedy | 521/170 |
| 5,039,755 | 8/1991 | Chamberlain et al. | 525/338 |
| 5,376,745 | 12/1994 | Handlin et al. | 526/178 |
| 5,391,663 | 2/1995 | Bening et al. | 526/178 |
| 5,393,843 | 2/1995 | Handlin et al. | 525/332.8 |
| 5,405,911 | 4/1995 | Handlin et al. | 525/139 |
| 5,416,168 | 5/1995 | Willis et al. | 525/333.2 |
| 5,418,296 | 5/1995 | Willis et al. | 525/385 |
| 5,710,192 | 1/1998 | Hernandez | 521/155 |

*Primary Examiner*—Morton Foelak
*Attorney, Agent, or Firm*—Beverlee G. Steinberg

[57] ABSTRACT

There is provided a high resilience polyurethane foam adhesive produced from a polydiene diol having a number average molecular weight from 1,000 to 20,000 and a functionality of from 1.6 to 2, an aromatic polyisocyanate, a tackifying resin and oil. In another embodiment, there is provided a polyurethane foam adhesive produced from a blend of a polydiene diol and a polydiene mono-ol, an aromatic polyisocyanate, and a tackifying resin.

40 Claims, No Drawings

5,849,806

RESILIENT POLYURETHANE FOAMS OF POLYDIENE DIOLS AND TACKIFYING RESIN

FIELD OF THE INVENTION

This application claims the benefit of U.S. Provisional Application Ser. No. 60/047,522, filed May 23, 1997, the entire disclosure of which is hereby incorporated by reference.

This invention relates to flexible polyurethane foams containing a polyol and tackifying resin, particularly a hydrogenated polybutadiene diol or diol/mono-ol blend, and a tackifying resin.

BACKGROUND OF THE INVENTION

Polyurethane foams having high resilience are typically produced from a polyether triol and an isocyanate. The polyether triols typically have a number average molecular weight of from 4,500 to 6,000 and an average functionality of from 2.4 to 2.7 hydroxyl groups per molecule. Toluene diisocyanate, diphenyl methane diisocyanate, toluene diisocyanate/diphenyl methane diisocyanate mixtures, and modified toluene diisocyanate or diphenyl methane diisocyanate versions are used to produce foams with broad processing latitude. Isocyanate functionality is typically 2.0, and in most cases not higher than 2.3 diisocyanate groups per molecule. The polyether triols form resilient foams when combined with the isocyanates having from 2.0 to 2.3 isocyanate groups per molecule under conditions which promote foaming.

U.S. Pat. No. 4,939,184 described the production of polyurethane foams from polyisobutylene triols and diols which were prepared cationically. The polyisobutylenes are premixed with an isocyanate, namely an isocyanate which is a mixture of meta- and para- isomers of toluene diisocyanate having a functionality of 2.0. Then water was added as a blowing agent to form the pqlyurethane foam. Foams obtained were of low resilience and were useful in energy absorbing applications.

U.S. patent application Ser. No. 08/494,640, incorporated herein by reference, described a high resilience polyurethane foam produced from a polydiene diol. The foam's resiliency was achieved by adding an aromatic polyisocyanate having a functionality of from 2.5 to 3.0 isocyanate groups per molecule to assure adequate crosslinking. The polydiene diol foams produced showed excellent humid aging properties in comparison to conventional polyurethane foams.

U.S. patent application Ser. No. 08/724,940, incorporated herein by reference, described a high resilience, high tear resistance polyurethane foam produced from a polydiene diol. The foam's resiliency was achieved by selecting an appropriate amount of a aromatic polyisocyanate having a functionality of from 1.8 to 2.5 isocyanate groups per molecule to assure adequate crosslinking. The polydiene diol foams produced showed excellent tear resistance and were near white in color.

None of the above described foams have adhesive properties. It is desirable to have a resilient foam which can also adhere to a substrate, either foamed-in-place or as a preformed pressure sensitive adhesive foam.

SUMMARY OF THE INVENTION

The composition of the present invention comprises a resilient polyurethane foam produced from a polydiene diol having a number average molecular weight from 1,000 to 20,000, an aromatic polyisocyanate, a tackifying resin, and oil. Another embodiment of the invention comprises a polydiene diol/polydiene mono-ol blend, an aromatic polyisocyanate, and a tackifying resin. The polydiene diol foams are pressure sensitive adhesive foams.

DETAILED DESCRIPTION OF THE INVENTION

The present invention is a resilient pressure sensitive polyurethane foam comprising 100 parts by weight (pbw) of a polydiene diol having a number average molecular weight from 1,000 to 20,000, more preferably from 1,000 to 10,000, most preferably from 3,000 to 6,000, from about 20 to about 55 pbw of an aromatic polyisocyanate, from about 50 to about 150 pbw tackifying resin, from 0 to about 100 pbw oil, and a blowing agent. In a preferred embodiment, the polydiene diol is hydrogenated and has a functionality of from 1.6 to 2, more preferably from 1.8 to 2, hydroxyl groups per molecule, and the polyisocyanate used has a functionality of from 2.5 to 3.0 isocyanate groups per molecule. The isocyanate is preferably added at a concentration which gives an equal number of isocyanate groups and hydroxyl groups. Up to 75 percent by weight of the diol may be replaced with a polydiene mono-ol, based upon the total weight of the diol/mono-ol. The foam has pressure sensitive adhesive qualities.

The polydiene diols used in this invention are prepared anionically such as described in U.S. Pat. Nos. 5,376,745, 5,391,663, 5,393,843, 5,405,911, and 5,416,168 which are incorporated by reference herein. The polymers provide stable, resilient foams when the polydiene diol is hydrogenated, although unsaturated polydiene diols will also result in polyurethane foams having high resilience. The polydiene diols have from 1.6 to 2, more preferably from 1.8 to 2 terminal hydroxyl groups per molecule. An average functionality of, for example, 1.8 means that about 80% of the molecules are diols and about 20% of the molecules are mono-ols. Since the majority of the product's molecules have two hydroxyl groups, the product is considered a diol. The polydiene diols of the invention have number average molecular weights between 1,000 and 20,000, more preferably from 1,000 to 10,000, most preferably from 3,000 to 6,000. Hydrogenated diols have a 1,4-addition between 30% and 70% are preferred.

Polymerization of the polydiene diols commences with a monolithium initiator containing a blocked hydroxyl or dilithium initiator which polymerizes a conjugated diene monomer at each lithium site. Due to cost advantages, the conjugated diene is typically 1,3-butadiene or isoprene, although other conjugated dienes will also work well in the invention. When the conjugated diene is 1,3-butadiene and when the resulting polymer will be hydrogenated, the anionic polymerization may be controlled with structure modifiers such as diethylether or 1,2-diethoxyethane to obtain the desired amount of 1,4-addition.

Anionic polymerization is terminated by addition of a functionalizing agent prior to termination. Functionalizing agents used are like those in U.S. Pat. Nos. 5,391,637, 5,393,843, and 5,418,296, incorporated herein by reference. The preferred functionalizing agent is ethylene oxide.

The polydiene diols are preferably hydrogenated to improve stability such that at least 90%, preferably at least 95%, of the carbon-to-carbon double bonds are saturated. Hydrogenation of these polymers and copolymers may be carried out by a variety of well established processes including hydrogenation in the presence of such catalysts as RANEY® Nickel, noble metals such as platinum and the like, soluble transition metal catalysts and titanium catalysts as described in U.S. Pat. No. 5,039,755, incorporated herein by reference.

The diene microstructures are typically determined by $C^{13}$ nuclear magnetic resonance (NMR) in chloroform. It is desirable for the polybutadiene diols and mono-ols to have at least about 40% 1,2-butadiene addition because, after hydrogenation, the polymer will be a waxy solid at room temperature if it contains less than about 40% 1,2-butadiene addition. Preferably, the 1,2-butadiene content is between about 40 and 60%. Isoprene polymers should have at least 80% 1,4-isoprene addition in order to reduce the glass transition temperature ($T_g$) and viscosity.

The polydiene diols used in the invention have hydroxyl equivalent weights between about 500 and about 10,000, more preferably between,500 and 5,000, most preferably between 1,500 and 3,000. Thus, for the polydiene diols, suitable number average molecular weights will be between 1,000 and 20,000, more preferably between 1,000 and 10,000, most preferably between 3,000 and 6,000. The hydrogenated polydiene diol of the Examples had a number average molecular weight of 3300, a functionality of 1.92, and a 1,2-butadiene content of 54%. The polymer was hydrogenated to remove more than 99% of the carbon to carbon double bonds. This polymer is referred to hereinafter as Diol 1.

The polydiene mono-ols used are prepared substantially as already described herein for polydiene diols except that polymerization is initiated with a monolithium initiator instead of a dilithium initiator. The monohydroxylated polydiene polymers have a number average molecular weight of about 500 to 20,000, preferably 2,000 to 8,000. The hydrogenated polydiene mono-ol of the Examples had a number average molecular weight of 3850, a functionality of 0.98 and a 1,2-butadiene content of 48%. The polymer was hydrogenated to remove more than 99% of the carbon to carbon double bonds. This polymer is referred to as Mono-ol 1.

The number average molecular weights referred to herein are number average molecular weights measured by gel permeation chromatography (GPC) calibrated with polybutadiene standards having known number average molecular weights. The solvent for the GPC analysis is tetrahydrofuran.

The isocyanates used in this invention are aromatic polyisocyanates since they have the desired fast reactivity to make foam. As the saturated polydiene diol has a functionality of about 2 hydroxyl groups per molecule, a polyisocyanate having a functionality of from 1.8 to 3.0, preferably 2.5 to 3.0, is used to achieve a crosslink density that results in a stable, high loadbearing and high resilient foam. Using isocyanates of lower functionality results in less stable foams having lower loadbearing capacity and having reduced resiliency. Higher isocyanate functionality will result in foam having a too high a crosslink density, which will negatively influence the tack properties of the foam.

An example of a suitable aromatic polyisocyanate is MONDUR® MR (Bayer), a polymeric diphenyl methane polyisocyanate which typically has an isocyanate functionality of 2.7. Also used is RUBINATE® 9225 (ICI Americas), a liquid isocyanate consisting of a mixture of 2,4-diphenyl methane diisocyanate and 4,4-diphenyl methane diisocyanate with a functionality of 2.06; however the addition of resin and oil to a foam made with this lower functionality polyisocyanate may result in foam collapse, requiring formulation adjustment.

The tackifying resins useful in the invention are relatively low molecular weight, predominately hydrocarbon polymers characterized primarily by their ring and ball softening points as determined by ASTM standard method E28. Normally, the resins will have softening points in the range of about 80° C. to about 120° C. In certain cases, however, lower softening point resins or liquid resins may be advantageous, for example to obtain the best tack at low temperatures.

A typical tackifying resin is one made by cationic polymerization of a mixture containing 60% piperylene, 10% isoprene, 5% cyclopentadiene, 15% 2-methyl-2-butene and about 10% dimer, as taught in U.S. Pat. No. 3,577,398. A resin of this type is commercially available as WING-TACK® 95 (Goodyear Tire & Rubber Company) and has a 95° C. softening point. The resins may also contain some aromatic character introduced by including styrene or α-methylstyrene in the mixture during polymerization of the resins.

Other types of adhesion promoting resins which are useful in the invention include hydrogenated rosins, esters of rosins, polyterpenes, terpenephenol resins, and polymerized mixed olefins. To obtain good thermooxidative and color stability, it is preferred to use a saturated resin such as a hydrogenated dicyclopentadiene resin such as ESCOREZ® 5000 series (Exxon Chemical Company), or a hydrogenated polystyrene resin such as the REGALREZ® series (Hercules, Inc.).

When using a tackifying resin having a high softening point, the resin may increase the viscosity of the foam to a point were foaming actually does not take place. Processibility of the foam may be improved by the addition of an oil to reduce the viscosity during foaming. Typical oils useful in the invention include paraffinic/naphthenic rubber process oils having a viscosity from about 10 to about 1000 centipoise at 100° F. An example of an oil suitable for use in the invention is SHELLFLEX® 371 (Shell Oil Company), a hydrocarbon process oil having a viscosity of 80 centipoise at 100° F. The compatibility of this oil with the polydiene diol/tackifying mixture is excellent. Therefore, there is no tendency for the oil to bleed out of the foam, allowing the concentration of oil to be adjusted to give the desired viscosity, foam density, and tack properties.

Processibility of the foam may also be controlled by replacing part of the polydiene diol with a polydiene mono-ol. The viscoelastic properties of the foam can be tailored for specific applications by adjusting the ratio of the diol to mono-ol. Adhesive foams containing mono-ol contents of up to 75% by weight of the diol/mono-ol mixture have been found to be suitable.

The polyurethane foams of the invention are produced from the polydiene diol, or a blend of polydiene diol and polydiene mono-ol, the aromatic polyisocyanate, the tackifying resin, a blowing agent, an amine catalyst, a delayed action amine catalyst, and a surfactant. Oil is added when a polydiene diol is used and may be added when the polydiene diol/mono-ol blend is used. Other ingredients like fire retardants, fillers, etc. may be added by those skilled in the art of making foam. Water, which causes foaming by reaction with the isocyanate to generate $CO_2$, is normally used as the blowing agent. The water content may be varied to alter the foam density. Typically the water content is in the range of from about 0.5 parts by weight to 3.5 parts by weight per hundred parts diol or diol/mono-ol mixture. Examples of an amine catalyst, delayed action amine catalyst, and silicon surfactant useful in making polyurethane foams from polydiene diols are DABCO® 33-LV amine catalyst, DABCO® DC-1 delayed action amine catalyst, and DABCO® DC-5160 silicone surfactant, all from Air Products and Chemicals.

The polyurethane foams are preferably prepared by blending all of the components except the isocyanate. The polydiene diol and mono-ol are preferably preheated to about 80° C. and the tackifying resin is preferably preheated to about 150° C. to reduce their viscosities prior to blending. After blending, the aromatic polyisocyanate is quickly added and briefly stirred before pouring the mixture into a mold to hold the expanding foam.

The polyurethane foams of the present invention are useful for making articles like foamed in place gaskets and sealers, preformed gaskets and sealers, and pressure sensitive adhesive tapes and labels.

DETAILED DESCRIPTION OF PREFERRED EMBODIMENTS

A preferred embodiment of the present invention is a resilient polyurethane foam comprising 100 parts by weight of a hydrogenated polydiene diol having a number average molecular weight from 3,000 to 6,000 and a functionality of from 1.8 to 2.0 hydroxyl groups per molecule, from 0.5 to 3.5 parts by weight of water, an aromatic polyisocyanate having a functionality of from 2.5 to 3.0 isocyanate groups per molecule at a concentration which will give an equal number of isocyanate and hydroxyl groups, from 50 to 150 parts by weight tackifying resin, from 10 to 100 parts by weight oil, from 0.4 to 0.8 parts by weight of an amine catalyst, from 0.3 to 0.6 parts by weight of a delayed action amine catalyst, and from 0 to 0.06 parts by weight of a silicon surfactant.

Another preferred embodiment of the present invention is a resilient polyurethane foam comprising 25 to 100 parts by weight of a hydrogenated polydiene diol having a number average molecular weight from 3,000 to 6,000 and a functionality of from 1.8 to 2.0 hydroxyl groups per molecule, 75 to 0 parts by weight of a polydiene mono-ol having a number average molecular weight of from 2000 to 4000, from 0.5 to 3.5 parts by weight of water, an aromatic polyisocyanate having a functionality of from 2.5 to 3.0 isocyanate groups per molecule at a concentration which will give an equal number of isocyanate as hydroxyl groups, from 50 to 150 parts by weight tackifying resin, from 0 to 100 parts by weight of oil, from 0.4 to 0.8 parts by weight of an amine catalyst, from 0.3 to 0.6 parts by weight of a delayed action amine catalyst, and from 0 to 0.06 parts by weight of a silicon surfactant.

The following examples are not intended to limit the present invention to specific embodiments although each example may support a separate claim which is asserted to be a patentable invention.

EXAMPLES

Six foams were prepared using Diol 1 or Diol 1/Mono-ol 1 mixtures, isocyanate (MONDUR® MR), catalysts (DABCO® 33-LV and DABCO® DC-1), surfactant (DABCO® DC-5160), and water in the combinations as shown in Table 1. Five of the samples also contained a tackifying resin (WINGTACK 95) and two foams contained a hydrocarbon processing oil (SHELLFLEX 371).

In the typical preparation, the diol, mono-ol and oil, if present, were preheated to 80° C. and the tackifying resin was preheated to 150° C. All the components in the formulation except the isocyanate were weighed into a dried can and mixed using a CAFRAMO® stirrer equipped with a 2-inch, regular pitch impeller. Isocyanate was then added and mixing was continued for about 45 seconds. By this time the mass would begin to foam and was poured into a paper bucket. After the foam stabilized and a skin formed, the foam was postbaked in an oven for ten (10) minutes at 110° C. Specimens were cut from the bun for measurement of foam density, hardness at 40% compression, resilience and hysteresis.

Density

Density was determined from the weight of a block and its dimensions. Results are given in Table 2.

Resilience

A 16 mm diameter (16.3 g) steel ball was dropped from a height of 51.6 cm through a 38 mm inside diameter clear plastic tube onto a block of foam measuring 10×10 ×5 cm. The rebound height was measured and resilience was calculated as 100 x (rebound height/drop height). Results are given in Table 2.

Compression Hardness and Hysteresis Loss

Compression hardness and hysteresis loss were measured on an INSTRON® Machine Model 5565. A foam block measuring 10×10×5 cm was placed between 2 parallel plates and compressed 60% then unloaded for four cycles at a crosshead speed of 12.5 cm/min. On the fourth cycle, the force required to compress the foam 40% was recorded, giving a measure of compression hardness of the foam. Hysteresis loss was calculated as the area under the stress/height curve on the fourth cycle relative to the first cycle. Results are given in Table 2.

TABLE 1

Foam Formulations

| Sample | Diol[1] (phr) | Mono-ol[2] (phr) | Oil (phr) | Resin (phr) | Water (phr) | Isocyanate (phr) | Amine Catalyst (phr) | Delayed Action Amine Catalyst (phr) | Surfactant (phr) |
|---|---|---|---|---|---|---|---|---|---|
| 1 | 100 | 0 | 0 | 0 | 1 | 23.5 | 0.4 | 0.3 | 0.02 |
| 9 | 100 | 0 | 100 | 82 | 2 | 37.0 | 0.8 | 0.6 | 0.04 |
| 10 | 100 | 0 | 50 | 100 | 3 | 51.8 | 0.8 | 0.6 | 0.04 |
| 11 | 50 | 50 | 0 | 100 | 3 | 49.8 | 0.8 | 0.6 | 0.04 |
| 12 | 50 | 50 | 0 | 50 | 1.5 | 27.6 | 0.4 | 0.3 | 0.02 |
| 13 | 25 | 75 | 0 | 50 | 1.5 | 26.6 | 0.4 | 0.3 | 0.02 |

[1]Hydrogenated polybutadiene diol, Mn = 3300, f = 1.92
[2]Hydrogenated polybutadiene mono-ol, Mn = 3800, f = 0.98

TABLE 2

Foam Properties

| Sample | Density (g/l) | Hardness at 40% Compression (N) | Resilience (%) | Hysteresis Loss (%) | Foam Cell Structure |
|---|---|---|---|---|---|
| 1 | 109 | 27.8 | 50 | 14 | very fine |
| 9 | 122 | 5.3 | 10 | 32 | very fine |
| 10 | 111 | 6.6 | 10 | 69 | fine |
| 11 | — | — | — | — | no growth |
| 12 | — | — | — | — | collapsed |
| 13 | 109 | 0.0 | 0 | 96 | very fine |

Sample 1 is an example of a high resilience foam and is used for comparative purposes. At the density of 109 g/l, it has a compression hardness of 28 N and has good resilience and low hysteresis loss. However, being resin-free it has no tack or adhesive character. Samples 9 and 10 examined the effects of adding tackifying resin and oil, and adjusting the water content, to give foams of approximately constant density. Results show that, as is required for pressure sensitive adhesives, these foams are much easier to compress, they have much less resilience and much greater hysteresis loss than comparative Sample 1. Both of foam Samples 9 and 10 were very nice pressure sensitive adhesives; both had good finger tack and both adhered well to paper and painted surfaces. Both could also be peeled cleanly off a substrate, providing examples of a removal adhesive foam. Samples 11–13 show the effects of using a polydiene diol/polydiene mono-ol blend with no oil. Satisfactory foams were not obtained with Samples 11 and 12. However, it is believed that by adjusting preheat temperatures, mixing schedules and catalyst concentrations, satisfactory foams can be made with these two formulations. Sample 13 was a very nice, very soft and tacky foam. Sample 13 was an unusual foam in that it showed no immediate rebound upon compression but, when allowed to stand, it would completely recover its initial shape and dimensions. Thus, the compression hardness was zero and the hysteresis loss was nearly 100% because on the short time scale of the test, there was almost no recovery of the foam after the first compression. In the resilience test, the foam merely dissipated the energy of the falling ball and there was no rebound.

While this invention has been described in detail for purposes of illustration, it is not construed as limited thereby but is intended to cover all changes and modifications within the spirit and scope thereof.

We claim:

1. A polyurethane foam composition comprising:
   a hydrogenated polydiene diol having a number average molecular weight from 1,000 to 20,000;
   an aromatic polyisocyanate;
   a tackifying resin;
   oil; and
   a blowing agent.

2. A composition according to claim 1, wherein the hydrogenated polydiene diol has a functionality of from 1.6 to 2 hydroxyl groups per molecule, and wherein the polyisocyanatehas a functionality of from 1.8 to 3.0 isocyanate groups per molecule.

3. A composition according to claim 2 wherein the polyisocyanate is at a concentration which gives an equal number of isocyanate groups and hydroxyl groups.

4. A composition according to claim 2 wherein the polyisocyanate has a functionality of from 2.5 to 3.0 isocyanate groups per molecule.

5. A composition according to claim 3 wherein the concentration of polydiene diol to tackifying resin is in the range of about 100:25 to 100:150.

6. A composition according to claim 5 wherein the concentration of polydiene diol to oil is in the range of about 100:25 to about 100:150.

7. A composition according to claim 6 wherein the blowing agent is water and wherein the concentration of water is between about 0.5 parts by weight and about 3.5 parts by weight per hundred parts diol.

8. A composition according to claim 2, wherein the polydiene diol is a polybutadiene diol.

9. A composition according to claim 2, wherein the polydiene diol has a number average molecular weight of 1,000 to 6,000.

10. A composition according to claim 9 wherein the polydiene diol has a functionality of from 1.6 to 2 hydroxyl groups per molecule.

11. A composition according to claim 10, wherein the polydiene diol is a polybutadiene diol.

12. A composition according to claim 2, wherein the aromatic polyisocyanate has a functionality of 2.7.

13. A polyurethane foam composition comprising:
   a hydrogenated polydiene diol having a number average molecular weight from 1,000 to 20,000;
   a hydrogenated polydiene mono-ol having a number average molecular weight from 500 to 20,000;
   an aromatic polyisocyanate;
   a tackifying resin; and
   a blowing agent.

14. A composition according to claim 13 wherein the polydiene mono-ol is present at up to 75 percent by weight of the total of polydiene diol and polydiene mono-ol.

15. A composition according to claim 14, wherein the polydiene diol has a functionality of from 1.6 to 2 hydroxyl groups per molecule, and wherein the polyisocyanate has a functionality of from 1.8 to 3.0 isocyanate groups per molecule.

16. A composition according to claim 15 wherein the polyisocyanate is at a concentration which gives an equal number of isocyanate groups and hydroxyl groups.

17. A composition according to claim 15 wherein the polyisocyanate has a functionality of from 2.5 to 3.0 isocyanate groups per molecule.

18. A composition according to claim 17 wherein the concentration of polydiene diol plus polydiene mono-ol to tackifying resin is in the range of about 100:25 to about 100:150.

19. A composition according to claim 13 further comprising oil.

20. A composition according to claim 15, wherein the polydiene diol is a polybutadiene diol.

21. A composition according to claim 20, wherein the polydiene mono-ol is a polybutadiene mono-ol.

22. A composition according to claim 15, wherein the polydiene diol has a number average molecular weight of 1,000 to 6,000.

23. A composition according to claim 22 wherein the polydiene diol has a functionality of from 1.6 to 2 hydroxyl groups per molecule.

24. A composition according to claim 23, wherein the polydiene diol is a polybutadiene diol.

25. A composition according to claim 17, wherein the aromatic polyisocyanate has a functionality of 2.7.

26. A polyurethane foam produced by a process comprising the steps of:

combining a hydrogenated polydiene diol having a number average molecular weight from 1,000 to 20,000 and a functionality of from 1.6 to 2 hydroxyl groups per molecule with an aromatic polyisocyanate having a functionality of from 2.5 to 3.0 isocyanate groups per molecule, tackifying resin, and oil; and foaming the combined polydiene diol, aromatic polyisocyanate, tackifying resin and oil to form a tacky polyurethane foam.

27. A polyurethane foam according to claim 26, wherein foaming agents are combined with the polydiene diol and oil prior to combination of the aromatic polyisocyanate.

28. A polyurethane foam according to claim 27, wherein the foaming agents comprise water, an amine catalyst, a delayed action amine catalyst, and a silicon surfactant.

29. A polyurethane foam produced by a process comprising the steps of:

combining a hydrogenated polydiene diol having a number average molecular weight from 1,000 to 20,000 and a functionality of from 1.6 to 2 hydroxyl groups per molecule, a hydrogenated polydiene mono-ol having a number average molecular weight from 500 to 20,000, an aromatic polyisocyanate having a functionality of from 2.5 to 3.0 isocyanate groups per molecule and tackifying resin; and foaming the combined polydiene diol, polydiene mono-ol, aromatic polyisocyanate, and tackifying resin to form a resilient polyurethane foam.

30. A polyurethane foam according to claim 29 wherein the polydiene mono-ol is present at up to 75 percent by weight of the total of polydiene diol and polydiene mono-ol.

31. A polyurethane foam according to claim 30, wherein foaming agents are combined with the polydiene diol, polydiene mono-ol and tackifying resin prior to combination with the aromatic polyisocyanate.

32. A polyurethane foam according to claim 29 wherein oil is combined with the polydiene diol, polydiene mono-ol and tackifying resin.

33. A polyurethane foam according to claim 29, wherein the foaming agents comprise water, an amine catalyst, a delayed action amine catalyst, and a silicon surfactant.

34. A polyurethane foam produced by a process comprising the steps of:

mixing 100 parts by weight of a hydrogenated polydiene diol having a number average molecular weight from 1,000 to 10,000 and a functionality of from 1.8 to 2.0 hydroxyl groups per molecule with from 50 to 100 parts by weight tackifying resin, from 50 to 100 parts by weight oil, from 1 to 2 parts by weight of water, from 0.4 to 0.8 parts by weight of an amine catalyst, from 0.3 to 0.6 parts by weight of a delayed action amine catalyst, and from 0.02 to 0.04 parts by weight of a silicon surfactant; and adding a polymeric isocyanate, wherein the polymeric isocyanate has a functionality of from 2.5 to 3.0 isocyanate groups per molecule and is added at a concentration which gives an equal number of isocyanate groups and hydroxyl groups.

35. A polyurethane foam according to claim 34, wherein the polydiene diol is a hydrogenated polybutadiene diol having from 40% to 60% 1,2-addition of butadiene.

36. A polyurethane foam according to claim 35, wherein the aromatic polyisocyanate has a functionality of 2.7.

37. A polyurethane foam produced by a process comprising the steps of:

mixing 25 parts by weight of a hydrogenated polydiene diol having a number average molecular weight from 1,000 to 10,000 and a functionality of from 1.8 to 2.0 hydroxyl groups per molecule and 75 parts by weight of a hydrogenated polydiene mono-ol having a number average molecular weight from 500 to 10,000 with from 50 to 100 parts by weight tackifying resin, from 1 to 2 parts by weight of water, from 0.4 to 0.8 parts by weight of an amine catalyst, from 0.3 to 0.6 parts by weight of a delayed action amine catalyst, and from 0.02 to 0.04 parts by weight of a silicon surfactant; and adding a polymeric isocyanate to the polydiene diol mixture, wherein the polymeric isocyanate has a functionality of from 2.5 to 3.0 isocyanate groups per molecule and is added at a concentration which gives an equal number of isocyanate groups and hydroxyl groups.

38. A polyurethane foam according to claim 37, wherein the polydiene diol is a hydrogenated polybutadiene diol having from 40% to 60% 1,2-addition of butadiene.

39. A polyurethane foam according to claim 38, wherein the aromatic polyisocyanate has a functionality of 2.7.

40. A polyurethane foam according to claim 37 wherein oil is mixed in with the polydiene diol, polydiene mono-ol, tackifying resin, water, catalyst and surfactant.

* * * * *